United States Patent [19]

Ozawa et al.

[11] Patent Number: 5,030,515

[45] Date of Patent: Jul. 9, 1991

[54] METHOD FOR RUBBER-TO-METAL BONDING

[75] Inventors: Hiroyoshi Ozawa, Hino; Masazumi Izawa, Yokohama; Akihiko Kasuya, Hadano, all of Japan

[73] Assignee: Lord Corporation, Erie, Pa.

[21] Appl. No.: 464,137

[22] Filed: Jan. 16, 1990

[51] Int. Cl.$^5$ .............................................. B32B 15/08
[52] U.S. Cl. ................................. 428/416; 156/315; 427/410; 524/361; 525/481; 525/502
[58] Field of Search ........................ 156/315; 524/361; 525/139, 333.1, 333.2, 332.8, 332.9, 502, 481; 428/416; 427/410

[56] References Cited

U.S. PATENT DOCUMENTS

| | | | |
|---|---|---|---|
| 2,927,094 | 3/1960 | Wheelock | 525/481 |
| 3,324,197 | 6/1967 | Schwarzer . | |
| 3,342,660 | 9/1967 | Angerer et al. | 428/416 |
| 3,887,539 | 6/1975 | Barth . | |
| 4,079,168 | 3/1978 | Schwemmer et al. | 156/315 |
| 4,378,450 | 3/1983 | Ema et al. . | |
| 4,435,543 | 3/1984 | Ema et al. . | |
| 4,755,548 | 7/1988 | Iwasa et al. | 156/315 |

*Primary Examiner*—John J. Gallagher
*Attorney, Agent, or Firm*—Philip P. McCann; W. Graham Buie

[57] ABSTRACT

A method for bonding a rubber substrate to a metal substrate wherein a primer composition is first applied to the surface of said metal substrate and the rubber substrate is then bonded to the primer composition-containing metal substrate surface using a rubber-to-metal bonding adhesive, the improvement comprising employing as the primer composition a mixture comprising an epoxidized diene polymer having a molecular weight of about 500 to 30,000 and a resole type phenolic resin, in a weight ratio of about 2 to 100 parts of said diene polymer per 100 parts of said resole type phenolic resin.

18 Claims, No Drawings

METHOD FOR RUBBER-TO-METAL BONDING

BACKGROUND OF THE INVENTION

This invention relates to improvements in rubber-to-metal bonding. More particularly, the invention is directed to using a mixture comprised of epoxidized diene polymer and methylolated phenolic resins as a primer in rubber-to-metal bonding operations.

In the adhesive bonding of rubber to metal, a primer is usually required so as to insure the formation of a strong adhesive bond. Furthermore, in many applications the primers must also be flexible to accommodate metal forming operations without loss of metal to primer adhesion, resistance to corrosion, thermal or chemical degradation and anodic or cathodic deterioration. In formulating primer compositions which possess the foregoing properties, the formulator must also consider the requirement that the primer must not only form a strong adhesive bond with the final or cover coating but also enhance the bonding between the adhesive and the metal.

Many structural parts utilized in various industrial applications contain rubber-to-metal adhesive bonds. One example of an industrial application which utilizes metal parts bonded to rubber substrates can be found in the automobile industry where fluid-filled engine mounting devices are used to mount engines to automobile frames in order to isolate engine vibration. The mounting devices employ rubber-to-metal bonds which are exposed to fluids such as ethylene glycol. At the increasingly high temperatures being experienced in current automobile engines, many of the traditional rubber-to-metal adhesives utilized in the mounting devices are exhibiting deterioration and unacceptable flexibility in these high temperature fluid environments.

It is an object of the invention, therefore, to bond rubber-to-metal substrates using a primer composition which after cover coating provides a bonded rubber-to-metal article of manufacture exhibiting outstanding flexibility and bonding properties.

Another object of the invention is to provide a rubber-to-metal adhesively-bonded assembly whose adhesive bonds exhibit strong resistance to corrosion, heat, humidity and chemicals such as ethylene glycol/water systems.

SUMMARY OF THE INVENTION

These and other objects are obtained by an improvement in the bonding of a metal substrate to a rubber substrate wherein the primer composition is first applied to a surface of the metal substrate and the rubber substrate is then bonded to the primer composition-coated metal substrate surface using a rubber-to-metal bonding adhesive; said improvement comprising using as said primer composition a mixture comprising an epoxidized diene polymer having a molecular weight of about 500 to 30,000 and a resole type phenolic resin, in a weight ratio of about 2 to 100 parts of said diene polymer per 100 parts of said resole type phenolic resin.

DETAILED DESCRIPTION OF THE INVENTION

Epoxidized Diene Polymer Component

The internally epoxidized diene polymer component of the primer composition is a rubber or an elastomeric polymer containing at least one epoxy group in the molecular chain of the polymer and having a molecular weight of at least about 500 up to about 30,000. In general, the epoxy equivalent of the epoxidized diene polymers will be at least about 500 up to about 30,000. The epoxidized diene polymer of this invention is obtained by reacting a diene polymer with a generally known epoxidizing agent.

Diene polymers which are useful for preparing the present epoxidized diene polymers include polybutadiene, polypentadiene, polyisoprene, diene rubber or other diene polymers and their derivatives. Diene polymers which have functional radicals such as carboxyl radical and hydroxyl radical at the end of the polymer chains can also be used.

Epoxidizing agents which may be reacted with the diene polymers of the invention include organic peracids such as performic acid, peracetic acid, perpropionic acid, perlaurylic acid and perbenzoic acid; and organic hydroperoxides such as t-butyl hydroperoxide and cumene hydroperoxide. Although not required, a lower molecular weight carboxylic acid such as formic acid, acetic acid or propionic acid may be utilized to enhance the performance of the hydroperoxide epoxidizing agents.

The epoxidization reaction is carried out by adding an epoxidizing agent to a diene polymer or by adding a diene polymer to an epoxidizing agent. The diene polymers can be used either by themselves or with solvents which do not react with epoxidizing agents. Typical solvents include chloroform, carbon tetrachloride, benzene, toluene, xylene and the like. It is also possible to carry out the epoxidization reaction by utilizing mixtures of hydrogen peroxide and cationic type catalysts such as sulfuric acid, phosphoric acid and p-toluene sulfonic acid, or by utilizing mixtures of hydrogen peroxide and low molecular weight carboxylic acids such as formic acid, acetic acid or propionic acid. When utilizing the above mixtures of hydrogen peroxide and acid, the diene polymers can be added to the epoxidizing mixtures or the epoxidizing mixtures can be added to the diene polymers or solutions of the diene polymers.

It should also be noted that the perbenzoic acid mentioned above may be generated in situ with the diene polymers by adding benzaldehyde to the reaction mixture in the presence of molecular oxygen and ultraviolet radiation as is known in the art.

Although the required quantities of epoxidizing agents depend on their nature and on the conditions for reaction, the epoxidizing agents are usually utilized in amounts in excess of the amounts calculated for the desired levels of oxirane oxygen in the final epoxidized polybutadiene polymer.

The temperature of the epoxidization reaction depends on the kinds of epoxidizing agents and catalysts being used. If organic peracids are utilized, the reaction temperature can range from 0°–95° C., preferably 40°–70° C. If organic hydroperoxides are utilized, the temperature can range from 7°–150° C., preferably 90°–140° C. The time for the reaction depends on the reaction temperature and desired oxirane oxygen content, but it is usually completed in several hours. After completion of the epoxidization reaction, an epoxy compound of the object material is obtained and residual catalysts, solvents and materials of low boiling point are removed by filtration or distillation under reduced pressure.

In addition to the above description the epoxized diene polymers may be obtained by polymerizing a monomer having an unsaturated bond and an epoxy group in its molecules such as glycidyl acrylate, glycydyl methacrylate, allyl glycidyl ether and at least a conjugated diethylenically unsaturated monomer having at least 4 carbon atoms either alone or with a minor amount of a dissimilar monomer. Suitable conjugated diethylenically unsaturated monomers include butadiene, isoprene, chloroprene halogenated (e.g., chlorinated) butadiene, etc. Illustrative of dissimilar copoymerizable olefinically unsaturated monomers are aromatic vinyl compounds such as styrene, vinyltoluene, vinylxylene, chlorostyrene, bromostyrene, dichlorostyrene, α-methylstyrene, acrylonitrile, methacrylonitrile, acrylic acid, methacrylic acid, acrylic acid esters such as methyl acrylate, ethyl acrylate, propyl acrylate, butyl acrylate, hexyl acrylate, 2-hydroxtyethyl acrylate, 2-hydroxypropyl acrylate, 2-ethylhexyl acrylate, methacrylic acid esters such as methyl methacrylate, ethyl methacrylate, propyl methacrylate, butyl methacrylate, hexyl methacrylate, lauryl methacrylate, 2-ethylhexyl methacrylate, acrylamide and methacrylamide.

The polymerization reaction forming the epoxidized diene polymer component as described immediately above is carried out in a conventional manner such as by bulk polymerization, emulsion polymerization, suspension polymerization, or solution polymerization, in the presence of conventional radical initiators, at a polymerization temperature of 0° C. to 150° C. and under atmospheric pressure or elevated pressure. If desired, chain transfer agents such as dodecyl mercaptan, lauryl mercaptan may also be employed.

Examples of suitable radical initiators include organic peroxides such as benzoyl peroxide, di-t-butyl peroxide, t-butyl perbenzoate, cumene hydroperoxide, methyl ethyl ketone peroxide, organic azo catalysts such as 2,2'-azobisisobutyronitrile, 2,2'-azobis(2,4-dimethylvaleronitrile), 2,2'-azobis(4-methoxy-2,4-dimethylvaleronitrile), 1,1'-azobiscyclohexanone-1-carbonitrile, 2,2'-azobis(2-amidino-propane)hydrochloride; inorganic peroxides such as potassium persulfate, ammonium persulfate, potassium bromate and hydrogen peroxide.

The preferred epoxidized diene rubber polymers of the invention are epoxidized polybutadiene and epoxidized polychloroprene having an epoxy equivalent of about 100 to 30,000.

Resole Type Phenolic Resin

The resole type phenolic resins of the invention are well known methylolated phenolic resins having the structure:

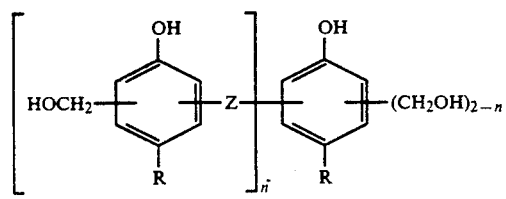

wherein Z is —CH$_2$—, —CH$_2$OCH$_2$— or

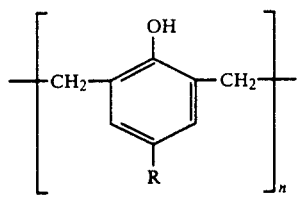

R is hydrogen, hydrocarbonyl radical containing from one to about 18 carbon atoms, —CH$_2$OH and/or CH$_2$OR' or halogen (Cl, Br, F), n is zero or 1, and m is an integer from 0–12.

These resins are prepared by reacting a phenol with an excess of formaldehyde in the presence of an alkaline catalyst. For oil solubility a phenol having a para-substituted hydrocarbon group having at least 4 carbon atoms such as tert-butyl, tert-amyl, hexyl, nonyl, dodecyl, etc. group is preferred. A number of preparations may be used such as disclosed in the textbook "Phenolic Resins", Pages 95–77, A Knop and L. Plato, Springer-Verlag New York 1985. These resins have relatively high methylol contents. Mixtures of dimethylolphenolic resins such as 2,6-dimethylol-4-nonylphenol and dibenzyl ether of 2,6-dimethylol-4-nonylphenol may also be used. Another desirable phenolic resin material may be prepared by reacting a mixture of phenol and a suitable para-substituted phenol with formaldehyde thereby resulting in a resin having a number of phenolic rings and an occasional methylol-group available for cross-linking. Generally, the preferred dimethylol phenolic resins used in the compositions of the invention have molecular weights between about 210 and 3000.

Optional Ingredients

Various additives such as fillers, supplemental film-formers, adhesion improvers and the like may be included in the primer composition of the invention, in amounts known in the art, without deleteriously altering the advantageous properties thereof. Such additives may enhance the viscosity and other desired properties from the standpoint of application of the primer. Fillers include finely divided substantially inert solid materials such as carbon black silica, titanium oxide and anticorrosion pigments such as zinc phosphate.

In preparation for use, the primer composition of the invention is prepared by mixing the components in an organic solvent such as alcohol solvents, e.g., methyl alcohol, ethyl alcohol, butyl alcohol, octyl alcohol, 2-ethylhexyl alcohol, nonyl alcohol, etc., ketone solvents, e.g., acetone, methylethylketone, methyl isobutyl ketone, isophorone, etc., ether solvents, e.g., isopropylether, n-butyl ether, ethylene glycol monomethylether, ethyleneglycol monoethyl glycol, etc., ester solvents, e.g., ethylacetate, isobutyl acetate, n-butyl acetate, 2-ethylhexyl acetate, etc., aromatic solvents, e.g., toluene, xylene, cyclohexane, ethylbenzene, etc. or solvent mixtures of the foregoing. The preferred solvents are ketone solvents.

Any suitable mixing means such as a high shear mixer or a sand mill can be employed to accomplish the mixing.

Covercoat Adhesive

The covercoat adhesive component of the present invention can be any of the adhesives conventionally employed in rubber-to-metal bonding. The conventional adhesives include compositions containing thermosetting condensation polymers; polymers and copolymers of polar ethylenically unsaturated materials, halogenated rubbers, and polyisocyanates.

The invention exhibits particularly advantageous results when the covercoat is an halogenated polymer or rubber adhesive composition such as those described, for example, in U.S. Pat. Nos. 3,258,388, 3,640,941, 3,282,883, 3,830,784, 4,119,587, all of which are hereby incorporated by reference.

Preferred rubber-to-metal bonding adhesives for use in the present invention are comprised of halogen-containing polymers or rubbers containing small amounts of poly-C-nitroso aromatic compounds such as are described in U.S. Pat. No. 3,258,388.

In the bonding operation of the invention, the primer composition is applied to the metal surface as by brushing, spraying, dipping or the like, preferably after it has been cleaned. The primer coating is allowed to dry and the covercoat adhesive applied thereover in a conventional manner. The applied covercoat is then permitted to dry to remove the solvent.

Drying may be carried out under ambient conditions, that is room temperature, in about 30 to 40 minutes. Solvent evaporation rate can be increased by the use of heat, forced air or both. Generally: forced drying temperatures should be maintained below 200° F.

The surfaces to be bonded are then brought together with the dried adhesive phase therebetween, and the adhesive cured under heat and sufficient pressure to insure intimate contact of the surfaces being bonded and the adhesive. The adhesive itself can be cured at temperatures ranging from about 250° F. to about 400° F. for a time commensurate with the temperature employed. Thus, at the lower end of the temperature range, curing may require as long as an hour; whereas at the upper end of the range, curing may occur in a matter of minutes. Typical representative curing conditions are 250° F. for 60 minutes, 275° F. for 20 minutes, and 300° F. for 5 minutes. The particular conditions selected may be dictated largely by the materials being bonded. For example, should an unvulcanized elastomer be bonded, in which case vulcanization (or curing) of the elastomer and curing of the adhesive will occur at the same time, conditions suitable for the vulcanization of the elastomer will be selected.

The following examples are given for purposes of illustration only and are not to be considered limiting. In the examples, the following tests were employed to characterize the invention.

Ethylene Glycol/Water Resistance Dipping Test

The assembled test piece after vulcanization at 160° C. for 15 minutes is dipped into a 70/30 ethylene glycol/water mixture maintained at a temperature of 120° C. for 2 weeks, after which it is removed and examined for separation.

90° Bend Flexibility Test

Adhesive coated metal substrates are bonded to 0.25 inch thick rubber sections. The bonded part is placed in a vise and bent approximately 90° in the middle of the bonded area. The rubber is pulled from the metal substrate until failure occurs. Failure in the rubber is desirous.

Peel Strength

Bonded rubber-to-metal samples are tested in accordance with ASTM-D 429-B standard adjusted to a 45 degree angle.

Tensile Strength

Force necessary to fracture rubber specimens as measured in accordance with ASTM-D 412-87.

EXAMPLE 1

The following primer composition was prepared by mixing the following ingredients on a high speed, high shear mill:

| | |
|---|---|
| Alkylresorcinol, (60% MEK Solution) | 25.0 |
| Resole resin (1) | 75.0 |
| Internal Epoxy Polybutadiene (2) | 30.0 |
| Carbon black | 32.5 |
| Titanium dioxide | 93.6 |
| Hydrophobic silica | 3.9 |
| MEK | 780.0 |
| | 1,040.0 |

The resulting formation has the following properties:

| | |
|---|---|
| Viscosity (#2 Spindle, 60 rpm, at 25° C.) | 13 (CPS) |
| Specific gravity (100 ml specific gravity cup, at 25° C.) | 0.955 (g/ml) |
| Solids content (dried for 2 hours at 107° C.) | 25.7 (%) |

Various rubber-to-metal bonded assemblies were prepared by applying the formulation to a prepared metal surface and after drying to remove solvent, the covercoat of a commercial rubber-to-metal adhesive was applied thereover. A rubber piece and metal piece were then brought together with the primer/covercoat therebetween and bonded together with curing (vulcanizing) for 15 minutes at 160° C. The rubber-to-metal bonded assemblies were then subjected to the Flexibility (90° Bend) Test and the Ethylene Glycol/Water Resistance Test. When Chemlok ®220 (Lord Corporation) covercoat was used, the Flexibility Test results showed total failure in the rubber 100R and none in the adhesive interface.

EXAMPLE 2

The primer compositions identified in Example 2 below are formed as in Example 1 and rubber-to-metal bonded assemblies were prepared in a similar manner using various commercial covercoat rubber-to-metal bonding adhesives. Each was tested for tensile strength, drawability, and "recent" stock.

| (Dry Weight) | A | B | C | D | E | F |
|---|---|---|---|---|---|---|
| Resorcinol | 100 | 100 | 100 | 100 | 100 | 100 |
| Epoxy Polybutadiene | 20 | — | 20 | — | 20 | — |
| Polyvinyl Butyral | — | — | — | — | — | 20 |
| Carbon Black | 10 | 10 | 10 | 10 | 10 | 10 |
| TiO2 | 30 | 30 | 30 | 30 | 30 | 30 |
| Silica | 5 | 5 | 5 | 5 | 5 | 5 |
| MEK | 635 | 635 | 635 | 635 | 635 | 635 |
| Covercoat Chemlok ® | | | Chemlok ® 220 | | | |
| Rubber Tearing | >90R | 60R | >90R | 50R | >90R | RC |

-continued

| (Dry Weight) | A | B | C | D | E | F |
|---|---|---|---|---|---|---|
| Tensile (kg/in) | 34 | 28 | 34 | 14 | 35 | 12 |

What is claimed is:

1. In a method for bonding a rubber substrate to a metal substrate to form a bonded assembly wherein a primer composition is first applied to the surface of said metal substrate and the rubber substrate is then bonded to the primer composition-containing metal substrate surface using a rubber-to-metal bonding adhesive, the improvement comprising employing as the primer composition a mixture comprising an epoxidized diene polymer having a molecular weight of about 500 to 30,000 and a resole type phenolic resin, in a weight ratio of about 2 to 100 parts of said diene polymer per 100 parts of said resole type phenolic resin.

2. A method according to claim 1 wherein the epoxidized diene polymer has a molecular weight of about 1,000 to 4,000.

3. A method according to claim 1 wherein the diene polymer is an epoxidized polybutadiene.

4. A method according to claim 1 wherein the diene polymer is an epoxidized polyisoprene.

5. A method according to claim 1 wherein said diene polymer is an epoxidized polychloroprene.

6. A method according to claim 1 wherein said diene polymer is a copolymer of butadiene and a dissimilar copolymerizable monomer.

7. A method according to claim 6 wherein the dissimilar copolymerizable monomer is styrene.

8. A method according to claim 6 wherein the dissimilar copolymerizable monomer is isoprene.

9. A method according to claim 1 wherein the rubber-to-metal bonding adhesive comprises a halogenated rubber adhesive.

10. A method according to claim 1 wherein the mixture is dissolved in a common organic solvent.

11. A method according to claim 10 wherein the organic solvent is a ketone.

12. A method according to claim 11 wherein the ketone is methylethyl ketone.

13. A method according to claim 1 wherein the primer composition contains a filler material and a pigment.

14. A method according to claim 13 wherein the filler material comprises silica and the pigment comprises carbon.

15. A method according to claim 1 wherein the primer composition is a solution of 2-100 parts by weight of an epoxidized polybutadiene per 100 parts of the resole type resin in methylethyl ketone.

16. A method according to claim 15 wherein the solution contains silica as a filler and carbon as a pigment.

17. The bonded assembly prepared by the method of claim 1.

18. The bonded assembly prepared by the method of claim 15.

* * * * *